United States Patent

[11] 3,626,797

[72] Inventors: Rodney K. Calvert, Dunwoody; Arthur B. Viescas, Decatur; Alton J. Fishback, Austell, all of Ga.
[21] Appl. No.: 17,459
[22] Filed: Mar. 9, 1970
[45] Patented: Dec. 14, 1971
[73] Assignee: The Mead Corporation

[54] SYNCHRONOUS CUTTER MECHANISM
7 Claims, 4 Drawing Figs.

[52] U.S. Cl. .................................................. 83/62, 83/110, 83/175, 83/339, 83/341, 83/355, 83/592
[51] Int. Cl. .................................................. B26d 5/22
[50] Field of Search .................................. 83/62, 110, 325, 339, 341, 355, 423, 348, 349, 354, 175, 331, 592

[56] References Cited
UNITED STATES PATENTS

| | | | |
|---|---|---|---|
| 3,183,754 | 5/1965 | Jensen | 83/341 |
| 1,252,114 | 1/1918 | Hren | 83/355 X |
| 3,269,244 | 8/1966 | Antwerpen et al. | 83/423 X |
| 3,431,701 | 3/1969 | Vargas | 83/355 X |
| 3,426,633 | 2/1969 | Jores | 83/341 |
| 2,587,732 | 3/1952 | Jaeger | 83/355 |

Primary Examiner—James M. Meister
Attorney—Walter M. Rodgers

ABSTRACT: Continuous movement is imparted to a chain made up of packets which are interconnected in end-to-end spaced relation by means of a pair of endless conveyor elements disposed on opposite sides of the path of movement of the chain of packets, a plurality of spaced projections being provided on each conveyor and being disposed in the space between packets so that movement of the working reaches of the conveyors in the same direction imparts movement to the chain of packets. A continuously rotatable cutting element is mounted alongside the chain of packets and synchronized to swing through the space between adjacent packages and thereby to sever the packets one from another. The cutter element is mounted on a shaft which is parallel to the conveyors and to the path of movement of the chain of packets as viewed in a horizontal plane and which is disposed at an angle to the path of movement of the packets and to the conveyors as viewed in a vertical plane thereby to compensate for movement of the packets during cutting so as to effect a vertical cutting operation.

Patented Dec. 14, 1971
3,626,797
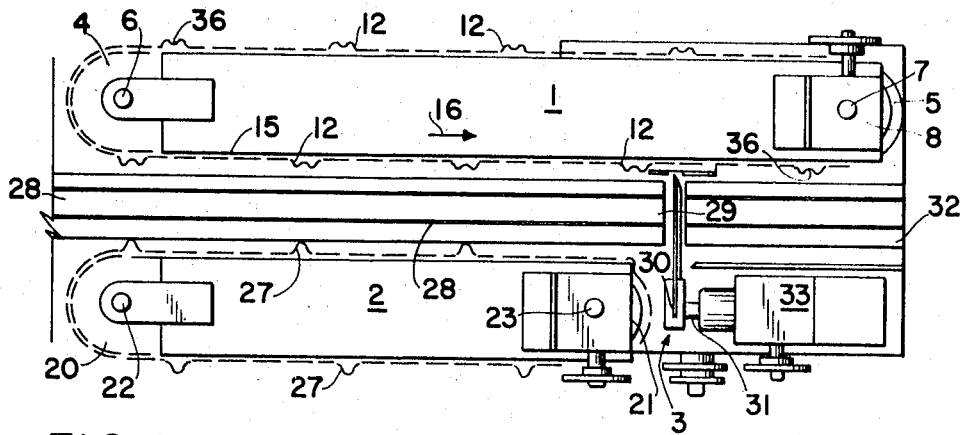
FIG. 1
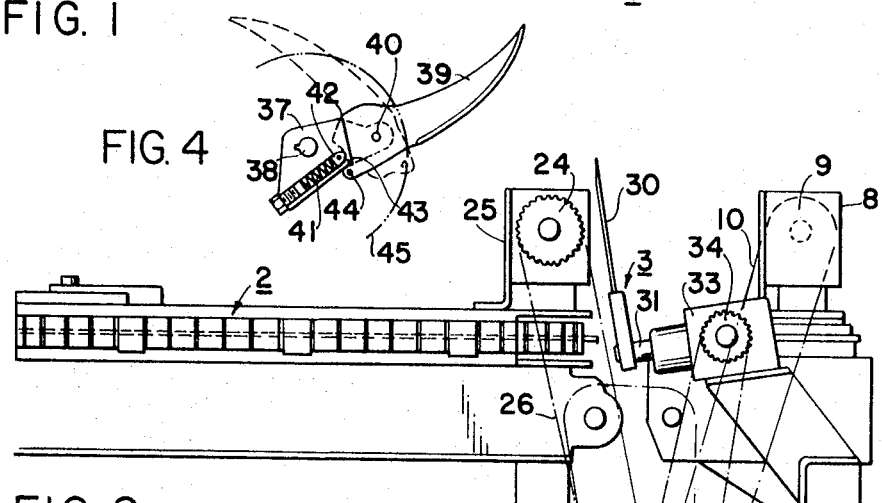
FIG. 4
FIG. 2
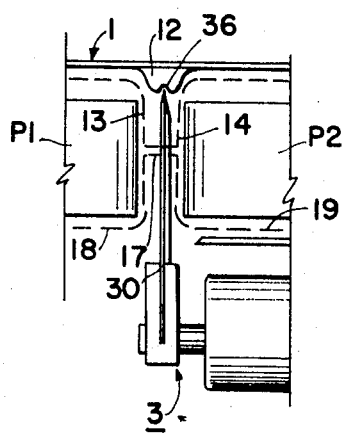
FIG. 3
INVENTORS
RODNEY K. CALVERT
ARTHUR B. VIESCAS
ALTON J. FISHBACK
BY *Walter M. Rodgers*
ATTORNEY

SYNCHRONOUS CUTTER MECHANISM

Cutting mechanisms for separating the packets of a continuous chain of packets are known in which ponderous reciprocating mechanisms are provided to impart reciprocating movement to a movable cutter blade. Obviously such mechanisms are complicated and expensive and must be of heavy duty construction so as to arrest movement of the heavy parts at the end of each operating stroke.

Other types of cutting mechanisms are known in which elliptical or rotary motion is imparted to a cutter element and in which the center of rotation is disposed in a transverse direction relative to the path of movement of the chain of packets. Obviously such rotation necessarily incorporates a component of movement which is in the direction of movement of the chain of packets and which therefore tends to impart irregular, jagged and otherwise undesirable severing of one packet from another.

According to this invention, a rotatable cutting element is driven in synchronism with a chain of packets to be severed and the shaft on which the cutter mechanism is mounted is angularly tilted relative to certain planes in which the chain of packets and the conveyors are disposed. By this means, fast and efficient operation are achieved and in addition the angular disposition of the plane in which the rotatable cutter element is disposed automatically compensates for movement of the chain of packets and thereby affords a straight line of severance which is normal to the path of movement of the chain of packets.

For a better understanding of the invention reference may be had to the following detailed description taken in conjunction with the accompanying drawings in which FIG. 1 is a plan view of the outfeed portion of a so-called shrink film type of packaging machine;

FIG. 2 is a side view of the mechanism shown in FIG. 1;

FIG. 3 is an enlarged fragmentary plan view of a portion of the mechanism shown in FIGS. 1 and 2 and which shows a pair of adjacent interconnected packets in the process of being severed one from the other; and in which FIG. 4 is an enlarged side view of a modified blade structure provided according to one facet of the invention.

In the drawings, the numeral 1 generally designates a main endless conveyor mechanism while the numeral 2 generally designates an auxiliary endless conveyor. The numeral 3 generally designates a rotatable cutter mechanism constructed according to this invention.

Main conveyor 1 is supported by a pair of sprockets 4 and 5 which are rotatable about shafts 6 and 7 mounted on the mechanism frame in any suitable manner. Sprocket 4 is an idler sprocket while sprocket 5 is driven by means of a gear mechanism 8 driven by gear 9 and chain 10 from a suitable gear or motor generally designated by the numeral 11. A plurality of projections 12 are disposed on the main conveyor 1. As is best shown in FIG. 3 these projections 12 are interposed between adjacent ends 13 and 14 of a pair of adjacent packets P1 and P2. Thus with the working reach 15 of main conveyor 1 moving from left to right as indicated by the arrow 16, projections 12 impart movement from left to right of a chain of packets designated schematically in FIG. 3 by the numerals P1 and P2. It will be understood that packets P1 and P2 are interconnected by means of a continuous film which envelopes a row of packages to form a chain of interconnected packets, P1 and P2. Packet P1 is enveloped by film 18 while packet P2 is enveloped by film 19. Films 18 and 19 are interconnected by film portion 17 which in FIG. 3 is shown as narrow in the horizontal plane but which could be narrow in some other plane if desired.

On the other side of the mechanism auxiliary conveyor 2 is mounted and comprises an idler sprocket 20 and a driving sprocket 21. Sprockets 20 and 21 are mounted on vertical shafts 22 and 23 respectively and operating motion is imparted to auxiliary conveyor 2 by the gear 24 and associated gear box 25 which in turn imparts rotation to shaft 23 and sprocket 21 by virtue of the interconnection through chain 26 between gear 24 and motivating device 11.

Since chains 10 and 26 are both driven by the driving device 11, conveyors 1 and 2 operate in synchronism and at the same speed.

Auxiliary conveyor 2 also is provided with a plurality of spaced projections 27 which are disposed along the working reach 28 of conveyor 2 and opposite the projections 12 formed on the working reach 15 of main conveyor 1. Thus the projections 12 move into the space between adjacent packets such as P1 and P2 from one side while the projections 27 on auxiliary conveyor 2 move into the same space from the other side. By this means the chain of packets is drawn through the outfeed portion of the machine in a stable and smooth manner due to the balanced application of force from opposite sides of the chain.

Since the auxiliary conveyor 2 is arranged so that its outfeed end adjacent sprocket 21 is spaced upstream from the outfeed end of the main conveyor 1 at the sprocket 5, space is thus made available for mounting the cutter element 3.

The supporting surface 28 is disposed between the conveyors 1 and 2 and its outfeed end 29 is adjacent the outfeed end of auxiliary conveyor 2. Thus, the cutter element 3 having a rotatable knife 30 mounted on rotatable shaft 31 may rotate in spaced relation to the outfeed end 29 of conveyor 28. An accelerating conveyor 32 is mounted in conventional fashion and quickly carries away a severed package such as P2 following the completion of a severing operation.

According to this invention, shaft 31 of the cutter element 30 is disposed in parallel alignment with the working reaches of conveyors 1 and 2 and with the chain of packets in a horizontal plane as is apparent in FIG. 1. Shaft 31, however, is angularly disposed in a vertical plane to the horizontal plane in which conveyors 1 and 2 and packets P1 and P2 are disposed as is apparent in FIG. 2. As is obvious from the drawings, shaft 31 is driven by a gear box 33 which in turn is operated by a gear 34 driven by chain 35 from the motivating mechanism 11. Thus cutter element 30 operates in synchronism with main conveyor 1 and auxiliary conveyor 2.

As is obvious from FIG. 3, the motion of the various parts is such that the cutter element 30 passes through the space between adjacent end-to-end packets such as P1 and P2 and in so doing severs the interconnection 17 and frees packet P2, for example, from the remaining packet such as P1. Thereafter packet P2 is quickly accelerated by acceleration conveyor 32 and moved out through the outfeed end of the machine.

Since the conveyors 1 and 2 move continuously resulting in continuous movement of the chain of packets represented by P1 and P2, it is possible, according to one feature of this invention, to provide a clean cut for the portion 17 which is vertical or normal to the path of movement of the chain of packets due to the fact that the plane in which the cutter element 30 rotates is disposed at an acute angle to the planes of the conveyors 1 and 2 and the plane in which the chain of packets is movable. Obviously the angle at which cutter 30 is tilted is a function of the speed of movement of the chain of packets. Stated otherwise, the magnitude of the acute angle between the cutter blade 30 and the conveyor 2, for example as shown in FIG. 2, is inversely related to the speed of movement of the working reach of both conveyors 1 and 2 in a direction from left to right.

Since the spaces between the ends of adjacent packets such as P1 and P2 is continuously occupied by projections 12 on main conveyor 1, it follows that provision must be made to accommodate the passage of the end of cutter blade 30 through the space between adjacent packages such as P1 and P2 without interference with the projections such as 12. Toward this end, a slot is provided in each of the projections 12 and such slot is indicated in the drawings by the numeral 36. Thus movement of the blade 30 through the connecting portions 17 between adjacent packets such as P1 and P2 is possible as is apparent in FIG. 3 wherein the end of blade 30 is shown disposed within the slot 36.

The fact that the main conveyor 1 extends toward the right a greater distance than does the auxiliary conveyor 2 is advantageous because it provides continuous steady movement of the packet until after the severing operation is completed. Furthermore, the shortness of auxiliary conveyor 2 relative to main conveyor 1 affords space in which to mount the cutter element 30 and its angularly disposed shaft 31 and its driving mechanisms 33 and 34. Furthermore the angular disposition of the shaft 31 from horizontal as shown in FIG. 2 provides a simple, fast, and efficient means for forming a clean, straight cut between adjacent packets such as P1 and P2.

The solid unitary blade 30 may be replaced by the articulated blade of FIG. 4 wherein the bracket 37 is mounted on shaft 38 and pivotally supports blade 39 at pin 40. Spring 41 biases cam element 42 toward the right into engagement with cam surface 43 on blade 39. Pin 44 is mounted on blade 39. The normal cutting position of blade 39 relative to bracket 37 is shown in solid lines so that blade 39 rotates about shaft 38. When a solid object is engaged by blade 39, as distinguished from the web 17, the blade 39 swings counterclockwise about pin 40 to occupy the position shown in dotted lines. This action causes pin 44 to engage a microswitch disposed in path 45 which operates and stops the machine.

The embodiments of the invention in which an exclusive property or privilege is claimed are defined as follows:

1. A cutter mechanism for severing at regular intervals a moving chain of packets interconnected with each other in spaced end-to-end relation, said mechanism comprising an elongated cutter element rotatably mounted on a shaft disposed in substantial alignment in one plane only with the direction of movement of said chain and spaced from said chain, means for imparting rotary movement to said cutter element which is synchronized with movement of said chain to effect cutting operations between adjacent packets, a main endless driven conveyor disposed with its working reach alongside said chain of packets, and lateral projections formed on said conveyor and interposed between spaced adjacent ends of adjacent packets whereby continuous movement is imparted to said chain, said projections being spaced so as to impart a slight tension force to the portion of said chain between said packets.

2. A cutter mechanism for severing at regular intervals a moving chain of packets interconnected with each other in spaced end-to-end relation, said mechanism comprising an elongated cutter element rotatably mounted on a shaft disposed in substantial alignment in one plane only with the direction of movement of said chain and spaced from said chain, means for imparting rotary movement to said cutter element which is synchronized with movement of said chain to effect cutting operations between adjacent packets, a main endless driven conveyor disposed with its working reach alongside said chain of packets, lateral projections formed on said conveyor and interposed between spaced adjacent ends of adjacent packets whereby continuous movement is imparted to said chain, said conveyor and said cutter element being disposed on opposite sides of said chain of packets, and a vertical slot formed in each of said projections and disposed to receive and allow passage therethrough of a part of said cutter element.

3. A cutter mechanism for severing at regular intervals a moving chain of packets interconnected with each other in spaced end-to-end relation, said mechanism comprising an elongated cutter element rotatably mounted on a shaft disposed in substantial alignment in one plane only with the direction of movement of said chain and spaced from said chain, means for imparting rotary movement to said cutter element which is synchronized with movement of said chain to effect cutting operations between adjacent packets, a main endless driven conveyor disposed with its working reach alongside said chain of packets, lateral projections formed on said conveyor and interposed between spaced adjacent ends of adjacent packets whereby continuous movement is imparted to said chain, an auxiliary driven endless conveyor disposed with its working reach alongside said chain of packets and on the opposite side thereof from said main conveyor, and lateral projections formed on said auxiliary conveyor and interposed between spaced adjacent ends of adjacent packets, the outfeed end of said auxiliary conveyor being spaced upstream from the outfeed end of said main conveyor.

4. A cutter mechanism according to claim 3 wherein said cutter element is disposed adjacent the outfeed end of said auxiliary conveyor and with its shaft in horizontal alignment therewith.

5. A cutter mechanism according to claim 4 wherein the plane in which said cutter element rotates is disposed at an acute angle to the plane in which said auxiliary conveyor is disposed.

6. A cutter mechanism according to claim 4 wherein the magnitude of said acute angle is inversely related to the speed of movement of said conveyors and of said chain of packets.

7. A cutter mechanism for severing at regular intervals a moving chain of packets interconnected with each other in spaced end-to-end relation, said mechanism comprising an elongated cutter element rotatably mounted on a shaft disposed in substantial alignment in one plane only with the direction of movement of said chain and spaced from said chain, means for imparting rotary movement to said cutter element which is synchronized with movement of said chain to effect cutting operations between adjacent packets, said elongated cutter element comprising a blade and a bracket articulated therewith and arranged for angular relative movement upon engagement of said blade with an object of substantial resistance and said blade being arranged to effect stoppage of said mechanism in response to predetermined relative angular movement between said blade and said bracket.

* * * * *